June 2, 1970   C. J. KOESTER ET AL   3,516,001
LIGHT-AMPLIFYING LASER STRUCTURES AND THE LIKE
Filed Dec. 1, 1966
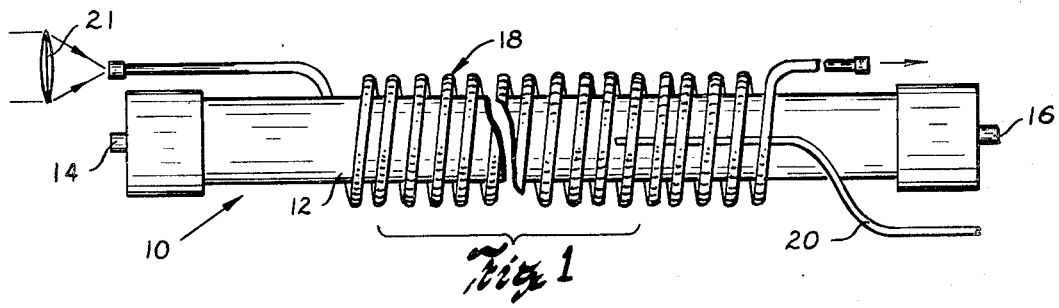
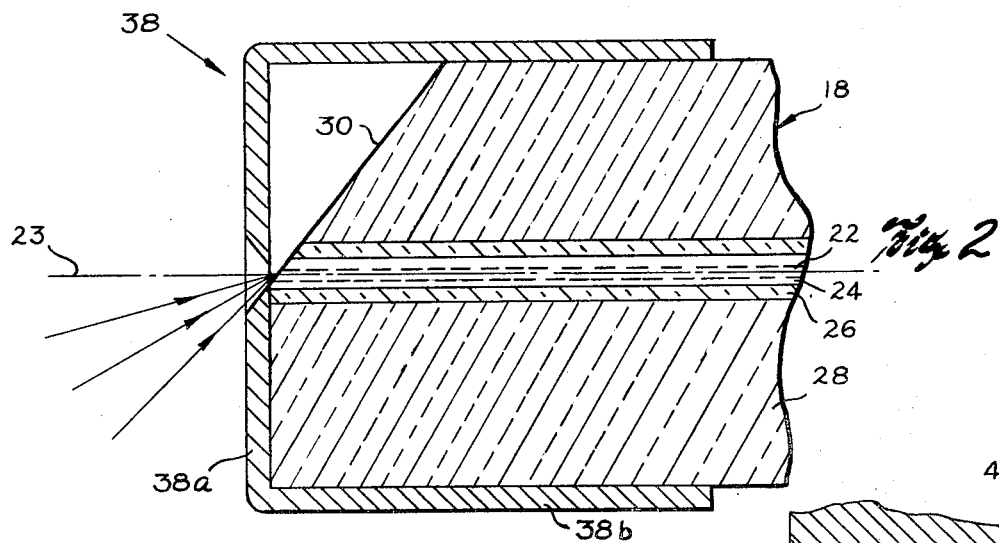
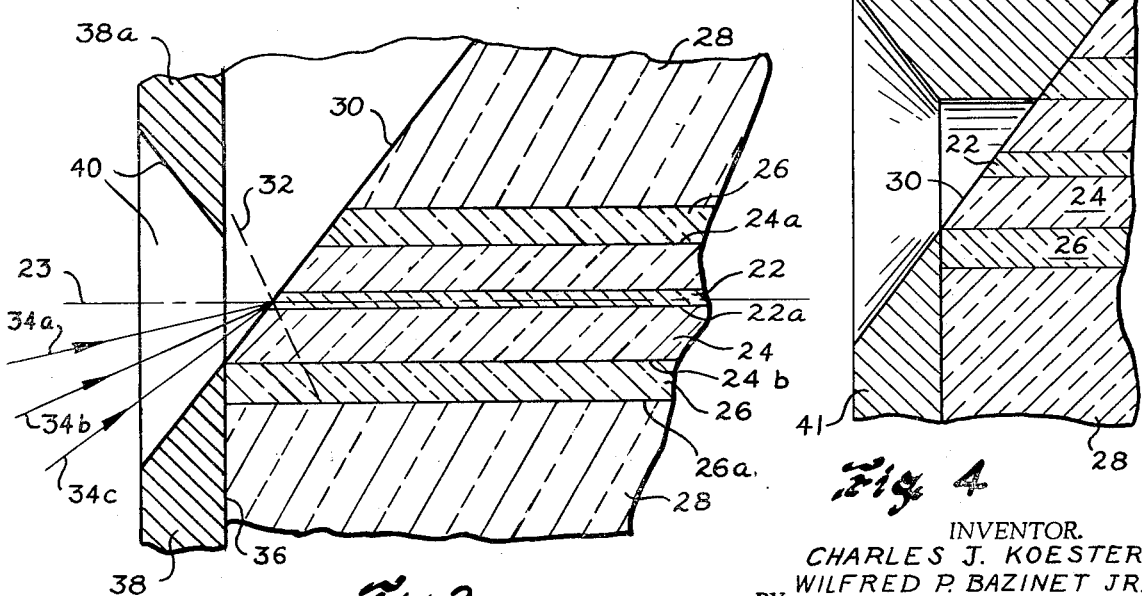
INVENTOR.
CHARLES J. KOESTER
WILFRED P. BAZINET JR.
BY CLIFFORD W. ASK
ATTORNEY United States Patent Office 3,516,001
Patented June 2, 1970

3,516,001
LIGHT-AMPLIFYING LASER STRUCTURES AND THE LIKE
Charles J. Koester, South Woodstock, Conn., Wilfred P. Bazinet, Jr., Webster, Mass., and Clifford W. Ask, South Woodstock, Conn., assignors, by mesne assignments, to American Optical Corporation, Southbridge, Mass., a corporation of Delaware
Filed Dec. 1, 1966, Ser. No. 598,414
Int. Cl. H01s 3/00
U.S. Cl. 330—4.3    4 Claims

ABSTRACT OF THE DISCLOSURE

Long thin fiber laser light-amplifying structure employing triple cladding for improved optical efficiencies in amplifying very weak optical signals from distant objects.

---

This invention relates to improvements in light-amplifying laser structures, components and the like, and more particularly relates to improvements in thin, elongated fiber optical light-amplifying laser structures and the like intended for use in amplifying optical signals of relatively low intensities, such as might be received from distant objects, satellites, stars or the like, said structure including means for insuring the high efficiency of operation thereof by preventing as much stray light or mis-directed light as possible from being introduced into the amplifying laser structure in such a way as to tend to deteriorate the input signal or create "noise" in the signal being amplified thereby.

The word "light" as used above and throughout the specification which follows is intended to be taken in its generic sense indicating not only optical energy within the visible region of the electromagnetic spectrum but within the infra-red and ultra-violet regions as well.

Light-amplifying laser devices in the form of elongated fiber-like structures are already known. In Koester et al. copending application Ser. No. 299,794 filed Aug. 5, 1963, and which application issued May 20, 1969, as U.S. Pat. No. 3,445,785, and assigned to the assignee of this application, there is shown an elongated laser amplifier structure arranged in helically coiled form about a pumping light source. This earlier laser structure comprises not only an elongated fiber-like core of light-transmitting laser material but also the core is surrounded throughout its length by a first cladding of clear, transparent material and a second cladding outwardly thereof of selectively absorbing light-transmitting material; said first and second claddings each having been carefully selected with reference to their respective optical and physical properties so as to function as desired together with said core.

In said earlier construction, the core was formed of a laser glass of fairly high predetermined refractive index value and the first cladding was formed of a clear glass of nearly the same or slightly lower predetermined refractive index value so as to provide therewith a refractive index difference of controlled value at a totally internally reflecting interface therebetween. This index difference in a straight structure was controlled so as to be of very small value while in a curved structure was, of necessity, of a little greater value in order to prevent the nearly axially directed light rays from leaving the core. Additionally, the second cladding was formed of a glass of substantially the same or nearly the same refractive index value as that of said first cladding, and, further, was of such light-transmitting and light-absorbing properties that optical energy at the pumping wavelength bands required for the laser core material would pass readily therethrough while optical energy at the emission wavelength of said laser material would be absorbed thereby.

Such a double cladding upon the fiber laser amplifier served a number of useful purposes. Not only did the first cladding upon the core insure a constant predetermined critical angle of total internal reflection for the optical energy to be transmitted longitudinally through said core, but also served the useful purpose of keeping the core clean and free from dust particles and the like. The second cladding surrounding the first cladding served the purpose of absorbing spontaneously emitted optical energy from within the core which was travelling at less than the critical angle and thus not so directed as to stay within the core and travel generally longitudinally thereof. This stray light, of course, if not absorbed, might very well tend to introduce "noise" and/or reduce the amplification factor or gain of the system. Also, the second cladding together with the first cladding, provided mechanical strength for the thin fiber laser core and served as means for immersing the core in a material of higher refractive index.

It has now been found, however, in connection with such a fiber laser amplifier structure intended for use in amplifying relatively weak signals from distant objects and the like, that for best results, care must be exercised as to the size of fiber laser core to be used. This is because when the core is too small in diameter, no signal transmission and thus no laser amplification will occur, and, on the other hand, when the core is too large, too much "noise" due to spontaneously emitted energy from within the laser material will result. In fact, since it has been found that the noise associated with this spontaneous laser emission increases as the square of the diameter of the fiber core, it is important that within workable limits, the core size be kept as small as conveniently possible.

It has also been found that, in a double clad fiber structure, care must be exercised as to the thickness of the first clear cladding material to be used upon such a laser core since if this first cladding is too thin, the input signal travelling within the core will be reduced in strength at each successive reflection thereof. Of course, at the same time, the amount of absorption material being used for the second cladding, and in keeping with the amount of absorption needed and the coefficient of light absorption thereof at laser emission wavelength, must be kept as small as conveniently possible in order not to unnecessarily reduce the transmission of the side-pumping optical energy therethrough.

When suitable sizes of double cladding thicknesses were employed heretofore to satisfy the above-mentioned requirement, it was found that the resulting structure was too thin and fragile for its intended purpose. Accordingly, an additional third cladding of clear glass of a relatively low refractive index is employed and made many times thicker than either of the other two claddings. This third cladding not only provides for the exceedingly thin and fragile fiber laser structure the additional mechanical strength needed to withstand the ordinary conditions encountered during its fabrication and operation but also gives better pump light-gathering ability than possible with other earlier structures. However, when such a very much thicker third lower index cladding was provided, it was found that additional steps had to be taken and additional means had to be provided in order to prevent stray or unwanted light from entering this thicker third cladding, particularly at the entrance end thereof, and detrimentally effecting the signal amplification thereof.

It is disclosed in a copending application Ser. No. 267,711, filed Mar. 25, 1963, and assigned to the assignee of this application, and which application issued Mar. 25, 1966, as U.S. Pat. No. 3,421,097, that a light signal of suitable wavelength directed into an end of a fiber laser amplifier structure to be amplified thereby, can be provided additional amounts of optical gain if the exit end thereof is provided with an optically finished flat end surface and if this exit end surface is suitably bevelled or sloped so as to prevent any material part of the light travelling within the laser core from being internally reflected at its exit end surface in such a way as to travel back along the length of the core by the process of total internal reflection so as to tend to reduce the amplification factor or optical gain thereof. It is also disclosed in this last-mentioned application that a centrally perforated end cap of apaque material may be used, if desired, upon the entrance end of such a fiber laser amplifier structure in order to prevent input signal light from entering the clear cladding surrounding the laser core and detrimentally affecting the signal being amplified.

However, it has now been found that the use of a very much thicker third cladding (many times thicker than either of the other claddings) upon a fiber laser amplifier structure and, particularly wherein the entrance end face is bevelled to increase the operating efficiency thereof, has greatly increased the difficulties experienced in trying to properly direct the relatively weak optical signals from distant light sources as focused light at high numerical aperture into such a triple-clad laser structure.

Accordingly, in connection with such a multilayer fiber laser structure intended to receive as much signal light as conveniently possible from distant sources, it has been found desirable to carefully form the entrance end of the fiber laser structure not only so as to have a flat end surface thereon and to dispose same at the particular angle or bevel desired for highest optical gain but also desirable to provide an opaque apertured end cap arrangement upon the entrance end thereof in such a way that as much of the available focused light as possible will be allowed to enter and impinge upon the fiber laser core. At the same time, the cap arrangement is such as to prevent as much undesired stray light as possible from entering the thick third cladding.

It is, accordingly, an object of the present invention to provide an improved fiber laser amplifier structure or construction comprising a fiber laser core of predetermined refractive index value and of many times greater length than the transverse dimension thereof and with the diameter of said core being of a very small value, ranging between approximately 2 and 100 microns, and to provide about this very thin fiber laser core and in optical contact therewith a clear transparent lower index first cladding of small wall thickness (of at least approximately 10 microns) and a second cladding of selectively absorbing material of similar lower refractive index value and of relatively small wall thickness. Of course, the second cladding will need to be of sufficient thickness according to its light-absorbing characteristics to absorb substantially all spontaneously emitted laser light received thereby.

It is an additional object of the invention to provide such a thin laser amplifier structure with a clear transparent third cladding of materially greater wall thickness than that of said first or second cladding, in order that the resulting structure will be provided the mechanical strength and durability needed for its normal uses and operation. It should be appreciated, of course, that the third cladding also serves the useful function of helping to refract more pumping optical energy into the thin fiber laser core than has been the case in earlier structures of smaller diameter.

It is a further object of the invention to provide said improved laser amplifier structure with a carefully and accurately formed and bevelled entrance end surface and to so shield and protect same by apertured end cap means of opaque material and special construction as to allow focused light rays at relatively high numerical aperture and at a mean angle of incidence of material angular value to be efficiently directed into said laser core without any material part thereof being allowed to reach said relatively thick third cladding.

Other objects and advantages of the invention will become apparent from the detailed description which follows when taken in conjunction with the accompanying drawing in which:

FIG. 1 is a side elevational view of a fiber laser amplifier structure embodying the present invention;

FIG. 2 is an enlarged cross-sectional view of an entrance end portion of said fiber laser amplifier structure;

FIG. 3 is an enlarged cross-sectional view of a part of the structure of FIG. 2, and diagrammatically showing light rays associated therewith; and FIG. 4 is a fragmentary sectional view showing a somewhat modified construction.

Referring to the drawing in detail and in particular FIG. 1, it will be seen that laser amplifier apparatus, indicated generally by the numeral 10, comprises a conventional rod-like flash tube 12, having electrodes 14 and 16 at its opposite ends, and about this flash tube is disposed a helically coiled relatively thin, elongated fiber laser amplifier component or structure 18. A wire, or the like, 20 serves in conventional fashion as high voltage means for triggering the flash tube. As shown at 21, a convergent lens or equivalent light-gathering means of high numerical aperture is provided for concentrating as much optical energy or signal as conveniently possible coming from a distant object, satellite, or the like onto the end of the improved fiber laser amplifier structure.

In FIG. 2, there is shown in an enlarged cross-section, and even in greater detail in FIG. 3, an end portion of the thin, elongated laser amplifier structure or component 18. It will be seen from FIGS. 2 and 3 that this component comprises a very thin, elongated fiber-like central, preferably circular, core 22 which is formed of a known laser glass having a relatively high predetermined refractive index value and smooth side walls 22a throughout the length thereof. The longitudinal axis of this core is indicated at 23. About this laser core 22 is disposed, in intimate optical contact with the smooth side wall portions thereof, a first cladding 24 of clear, transparent glass of a relatively lower predetermined refractive index than that of said core, and outwardly of this first cladding and in optical contact with the smooth outer side walls 24a thereof is disposed a second cladding 26 of glass having substantially the same or slightly higher predetermined refractive index value than that of said first cladding as well as predetermined selectively absorbing and light-transmitting characteristics. A very much thicker clear third cladding 28 is disposed about and in optical contact with the smooth side walls 26a of the second absorbing cladding 26 and this third cladding may have substantially the same refractive index value as that of said first cladding 24 and might even be of the same kind of glass as that employed for forming said first cladding.

A suitable laser glass would be a neodymium laser glass, a suitable first cladding glass would be a soda-lime silicate glass and a suitable selectively absorbing glass to function therewith would be a samarium or dysprosium doped soda-lime silicate glass or the like. As stated above, the glass for forming the third cladding could be substantially like that used for said first cladding.

It is desirable that the fiber laser amplifier core 22 be of very small size, and cores having diameters of between 2 microns and 100 microns are preferred. While a minimum diameter of 2 microns has been specified, it has been found that a more practical small size might be in the neighborhood of 10 microns for good transmission and amplification of optical signals therethrough. On the other hand, a maximum diameter for the laser core of approximately 100 microns has been mentioned since it is preferable to keep the "noise," due to spontaneous laser emission within the laser core material at a minimum, and since such noise increases as the square of the diameter of the laser core, a maximum of 100 microns has been specified as a tolerable upper noise limit. A preferred core diameter would be between approximately 10 and 30 microns.

A minimum wall thickness for the first cladding 24 of approximately 10 microns has been found, from investigation, to be best for most purposes since when a wall thickness of less than 10 microns for this clear first cladding was employed, some penetration of the optical energy of the signal travelling within the core into the clear cladding at each successive reflection occurred and some loss of energy was experienced at each such reflection. However, when first cladding thicknesses of at least 10 microns were employed, such losses were materially reduced. Accordingly, a value of approximately 20 microns in wall thickness for the first cladding has been found to be satisfactory and generally preferable. On the other hand, it is possible that the wall thickness for said first cladding could be as large as ½ millimeter and still provide acceptable results.

Of course, at the same time, it is essential to provide at all peripheral locations about the first cladding a sufficient thickness of absorbing cladding material in the second cladding 26 in order to properly care for the spontaneously emitted laser radiation received thereby. It follows, of course, that if the thickness of the first cladding is increased, the unit intensity of the spontaneously emitted radiation reaching the second absorbing cladding will be accordingly less. Nevertheless the same wall thickness as before will be required for the second cladding if it is still to provide the same degree of absorption for the light impinging thereon.

It has been found heretofore when attempting to provide thin fiber laser amplifier structures of such double-clad type of appreciable length so as to be disposed in helically coiled relation about a flash tube, or the like, that the diameter thereof with reference to its length was much too thin and a much too fragile construction resulted.

It has now been found that even though an even thinner laser core than previously is desirable, a very thick third cladding of clear glass may be used and disposed in surrounding relation to and in optical contact with said second cladding and provide improved results. Preferably, this third cladding would have a lower refractive index than that of the second absorbing cladding, so that no light becomes trapped within the larger third cladding. In this way, the third cladding provides the improved laser structure with sufficient strength and durability to withstand the normal uses and conditions of operation to which the laser structure will be subjected. A wall thickness in the neighborhood of 1.5 millimeters (1500 microns) or so for the third clear cladding has been found to provide satisfactory results.

Difficulties, however, have been experienced when such a thicker fiber laser amplifier structure has been provided due at least in part to light entering and travelling within the thicker third cladding material. One advantage, however, which has been obtained by use of such a thicker third cladding is that suitably sloped or bevelled polished surfaces may be more easily and accurately provided upon the end or ends of the structure than heretofore. Such a sloping surface is indicated at 30. Also, a transverse end surface 36, the purpose of which will be presently described, may be more easily and accurately formed upon this thicker laser structure than on thinner structures of earlier kind.

The reason for such a sloping surface 30 at one, or even at both ends, of the fiber laser amplifier component is so that when this surface is disposed at the correct predetermined angle relative to the longitudinal axis 23 of the laser core adjacent thereto, light travelling within the core and impinging upon this sloping end surface will not, on the one hand, experience total internal reflection at said end surface and, on the other hand, will not be allowed even in part to so internally reflect from this end surface as to travel back down the laser core by the process of total internal reflection and tend to deplete the inversion of population within the laser material thereof.

It has now been found that when a fiber laser amplifier structure of such larger total diameter is so sloped at its entrance end to aid light amplification, the use of a centrally perforated protective shield or cap is desirable and also that this cap or shield should be carefully formed so as to allow this focused input optical energy or signal from a distant object to be directed at a high numerical aperture and without any appreciable loss of energy into said core. The light from the distant object, satellite, star or the like is often, at best, weak or of low intensity and, accordingly, the lens system 21, or the like, should not only be of high numerical aperture in order to concentrate as much of this available energy as possible into a small image substantially at the entrance end of the fiber laser core, but also none of this signal energy should be allowed to enter other end portions of the structure in such a way as to have a detrimental effect upon the gain of the system.

In FIG. 3, there is indicated at 32 a tilted focal plane at which strongly convergent light rays 34a, 34b and 34c from a distant object are being focused. These light rays, it will be noted, are all at appreciable angles to the sloping entrance surface 30 before entering the component and being refracted longitudinally within the core 22. In order to allow this light to best impinge upon sloping surface 30 and enter said core, it has been found desirable to grind away the pointed end of the component after the surface 30 has been carefully formed thereon and thus provide the transverse finished surface 36. Note that this transverse surface 36 is disposed upon the fiber laser component at such a location as to coincide substantially with the outermost corner 24b of the clear cladding material 24. Thus, when an end cap 38 having a thin transverse end wall 38a and side walls 38b is provided and arranged to abut with the end surface 36, said end wall having already been provided with a relatively widely flaring central aperture 40 for permitting convergent focused light rays to reach said core, an improved fiber laser amplifier structure will result.

It will be appreciated, of course, that not only is a focused beam of relatively wide angular value being directed toward the end surface of the laser core 22 but also because of the sloping condition of the end surface 30 of the laser component and the appreciable angle of incidence to be used for the focused beam, it may be desirable to use a modified end cap construction and such is shown at 41 in FIG. 4. In this construction, the cap is pre-formed so as to fit closely adjacent surface parts of the end of the laser component. Thus, a filler or solid gusset portion 42 serves to prevent any improperly directed or focused divergent light rays which might tend to travel beyond the focal plane from reaching the cladding 26 or cladding 28.

A suitable elongated fiber laser amplifier structure of the type described herein and having an overall fiber diameter of from 1 to 1.5 millimeters and an overall length from 3 inches to 1 meter or more is possible and same may be coiled into a spiral of materially reduced overall length. In fact, a fiber laser amplifier structure of such sizes and helically coiled into a three inch length has been successfully operated for amplification purposes at an input power of approximately 220 joules.

The improved fiber laser amplifier component 12 may be formed in the following manner. A length of rod of laser glass of proper index and tube of clear glass of like length and lower refractive index may be prepared in the manner described in United States patent, Hicks No. 2,980,957, and assembled, heated at one end and drawn down to produce an elongated composite single-clad member of smaller cross-sectional size. Thereafter, a length of this composite member may be, in like manner, prepared and assembled within a tubular element formed of glass of a proper index and desired selectively absorbing characteristics and this second assembly heated at one end and drawn down to desired smaller size. Accordingly, when a length of the double-clad member thus formed is again properly prepared and placed within a very much thicker-walled tubular element of clear lower index glass and heated at one end and drawn down to proper size, an elongated triple-clad component like that suggested in FIG. 2 of the instant drawings will result. A careful re-heating of a length of this triple-clad component may then be used to form a helically-shaped member of desired size and arrangement. Note, for example, FIG. 1. Of course, the ends of the component must be carefully ground and polished as described above before same is used for amplifier purposes as described herein.

What is claimed is:

1. A light-amplifying laser structure comprising a single thin, elongated, helically coiled main body member of great length in comparison to the transverse dimension thereof, said main body member comprising a fiber optical core of laser glass having a relatively high predetermined refractive index, said core having smooth outer side wall portions throughout the length thereof and a diameter of a value of between approximately 10 to 30 microns, a first cladding of clear transparent glass of a relatively low predetermined refractive index value disposed in surrounding relation to and intimate optical contact with the side wall portions of said core throughout the length thereof, said first cladding having smooth outer side wall portions and a wall thickness of between approximately 10 and 500 microns, a second cladding disposed in surrounding relation to and in intimate optical contact with side wall portions of said first cladding throughout the length thereof, said second cladding being formed of a selectively absorbing glass having good light-transmitting properties for optical energy at the pumping wavelength band of said laser glass while providing good absorption for optical energy at the emission wavelength of said laser glass, said second cladding having a higher refractive index value than that of said first cladding, and having a wall thickness between approximately 10 and 20 microns so as to absorb most of the spontaneously emitted laser light energy which may enter said second cladding during laser operation, and a third cladding of clear transparent glass of a lesser refractive index value than that of said second cladding and disposed in surrounding intimate optical contact with the side wall portions of said second cladding throughout the length thereof, said third cladding being between 1 and 1½ millimeters in diameter, whereby very weak optical signals received at high numerical aperture by said core from distant objects may be efficiently amplified during optical pumping of said structure.

2. A light-amplifying laser structure as defined in claim 1 having an optically finished sloping flat end wall formed on the entrance end of said core and said first cladding, said flat end wall being disposed thereon at such a sloping angle relative to the longitudinal axis of said core adjacent thereto as to allow optical energy at said laser emission wavelength travelling within said core and impinging upon said end wall to pass outwardly therethrough without experiencing total internal reflection at said end wall, and also so sloped that any part of said internally travelling optical energy at laser emission wavelength which might be reflected at said end wall will be so directed as to pass outwardly through side wall portions of said core and into said first and second claddings without experiencing total internal reflection at the side wall portions of said core.

3. A light-amplifying laser structure as described in claim 1 additionally comprising a cap-like shield formed of opaque material and disposed upon the entrance end of said main body member, said shield having a thin end wall portion provided with a relatively small outwardly facing flared central aperture therein arranged to expose said core and only a part of said first cladding adjacent thereto, said aperture and flare being of such size and shape as to allow light rays at relatively large angles of convergence to pass therethrough and impinge mainly upon the angularly sloping surface of said central core in such a manner as to be refracted longitudinally within said core.

4. A light-amplifying laser structure as described in claim 1 additionally having at the entrance end of said main body member a transversely extending surface upon said second and third claddings, and intersecting said angularly sloping end wall laterally of said core and first cladding, and a cap-like shield disposed upon the entrance end of said main body member and arranged in closely fitting relation to said sloping end wall and said transversely extending surface, said shield being formed of opaque material and having a thin end wall portion provided with a relatively small outwardly facing flared central aperture therein arranged to expose said core and only a part of said first cladding adjacent thereto, said aperture and flare being of such size and shape as to allow light rays at relatively large angles of convergence to pass therethrough and impinge substantially upon the sloping surface of said central core in such a manner as to be refracted longitudinally within said core.

References Cited

UNITED STATES PATENTS 3,273,072    9/1966    Koester et al. _____ 330—4.3

OTHER REFERENCES

Koester et al.: Applied Optics, October 1964, pp. 1182–1186, 330–4.3.

DARWIN R. HOSTETTER, Primary Examiner

U.S. Cl. X.R.

330—56; 331—94.5; 350—96